United States Patent [19]

Wasik et al.

[11] 4,333,241
[45] Jun. 8, 1982

[54] PASTA MEASURER

[76] Inventors: Ronald J. Wasik; Janice E. Wasik, both of 544 Forest Hill Dr., Kitchener, Ontario, Canada

[21] Appl. No.: 247,222

[22] Filed: Mar. 24, 1981

[51] Int. Cl.³ .............................................. G01B 3/02
[52] U.S. Cl. ................................. 33/174 T; 33/137 R
[58] Field of Search ................. 33/174 T, 179, 137 R; 24/16 R, 16 PB, 17 A, 17 AP, 22, 30.5 P, 150 FP

[56] References Cited

U.S. PATENT DOCUMENTS

| | | | |
|---|---|---|---|
| 438,453 | 10/1890 | Wareham | 33/179 |
| 458,564 | 9/1891 | Engel | 33/179 |
| 789,352 | 5/1905 | Badger | 33/137 R |
| 1,011,628 | 12/1911 | Klein | 33/179 |
| 1,980,843 | 11/1934 | Andrews | 24/17 A |
| 2,205,626 | 6/1940 | Mason | 33/179 |
| 2,262,664 | 11/1941 | Bresson | 33/137 R |
| 2,317,507 | 4/1943 | Zimmermann | 24/17 AP |
| 2,529,058 | 7/1950 | Tell et al. | 33/179 |
| 3,874,085 | 4/1975 | Atkins | 33/174 T |
| 4,120,094 | 10/1978 | Pfaelzer | 33/174 T |
| 4,214,369 | 7/1980 | Wasik et al. | 33/174 T X |

FOREIGN PATENT DOCUMENTS

| | | |
|---|---|---|
| 7318 | 3/1877 | Canada . |
| 185952 | 7/1918 | Canada . |
| 332692 | 4/1932 | Canada . |
| 358400 | 5/1935 | Canada . |

OTHER PUBLICATIONS

American Machinist, Aug. 7, 1950, "Practical Ideas", p. 119, Pipe Tape.

American Machinist, 8/7/1950, p. 119, "Pipe Tape Shows Nominal Sizes".

*Primary Examiner*—Charles E. Phillips
*Attorney, Agent, or Firm*—Burke-Robertson, Chadwick & Ritchie

[57] ABSTRACT

A device for measuring the quantity of raw pasta required to produce the desired amount of cooked pasta. In the domestic market most packaged spaghetti is ten inches in length and a simple measurer for calculating the required amount of this raw product selected for cooking is a non-stretchable, flexible measuring line that can be looped around a bundle of spaghetti to determine its circumference. The line is calibrated and can show the number of serving portions of cooked spaghetti that the encircled bundle will produce. To facilitate its use in the family kitchen the line is provided with a ring on one end thereof that can be slipped over the thumb of the user and holding a bundle of spaghetti, of approximately correct size, in her hand the line is wrapped around the spaghetti to measure its circumference and determine if more or less spaghetti is needed.

To further facilitate its use the line is provided with a locking feature whereby after a quantity of pasta has been measured, the line will remain locked in place around the bundle to hold it in a convenient form until placed in a cooking vessel. In the preferred form the locking feature comprises utilizing calibrations in the form of holes through the line accessible through discontinuities in the side of the line, and utilizing a narrowed portion of the line as a reference point whereby locking is effected by placing the reference point in the desired calibration hole.

2 Claims, 2 Drawing Figures

U.S. Patent   Jun. 8, 1982   4,333,241
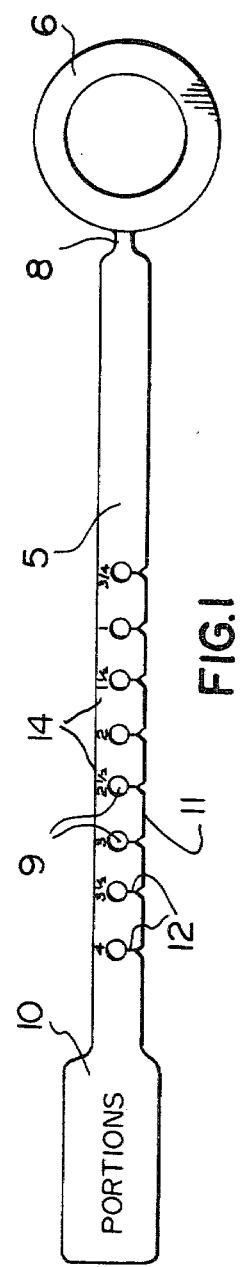
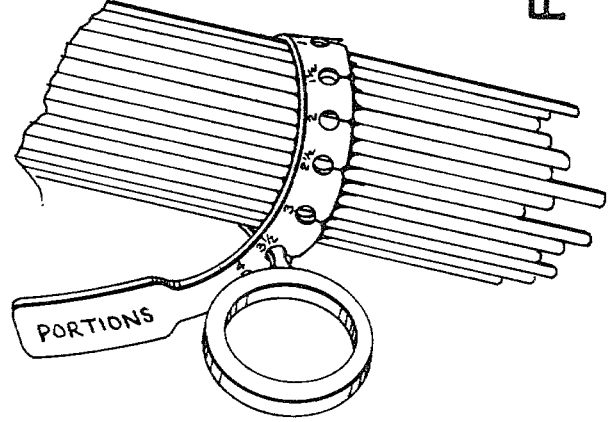
FIG.1
FIG.2

PASTA MEASURER

BACKGROUND OF THE INVENTION

This invention relates to a measuring device appertaining more particularly to a raw pasta measurer for selecting the quantity of raw pasta (e.g. spaghetti, vermicelli, etc.) required to produce the desired amount of the cooked product.

Measuring devices of a wide variety are known that provide a flexible member calibrated for some particular purpose such as measuring fabrics, the length of portions of knitted articles, lumber, land, etc. See Canadian Pats. Nos. 7,318; 185,952; 332,692 and 358,400; and also U.S. Pat. No. 3,469,587. None of these suggest a device which is suitable for accurately measuring a handful of dry spaghetti-type pasta of a given length to determine the quantity to be cooked to provide the desired amount of the end cooked product.

U.S. Pat. No. 4,214,369, issued July 29, 1980, to the present applicants, describes and claims one suitable measurer. The present application provides a substantial improvement over this earlier device.

With the growing recognition of using pasta as a reliable food for improving nutrition, interest has increased in the proper cooking of the product. Some domestic manufacturers recommend that spaghetti be cooked in salted water eight times the weight of the spaghetti. From a scientific standpoint this is an inadequate amount of water, a minimum ratio of 10:1 should be used. Furthermore the addition of salt is a mistake as it lengthens the cooking time by 10-20 percent and increases the pasta stickiness. So both these recommendations of the manufacturers are undesirable.

When it comes to properly cooking pasta the consumer is at a real disadvantage, being without both the essential equipment and the knowledge, and lacking even simple quantity measuring procedure with the result that some considerable food wastage results.

OBJECTS OF THE INVENTION

Accordingly, it is an object of this invention to provide a device for accurately measuring the quantity of raw pasta required to produce a desired amount of the cooked product.

Another object is to provide a raw pasta measurer that enables the rapid and reliable selection of the required quantity of the dry uncooked pasta, said measurer including a flexible line for measuring the circumference of a hand-held bundle of raw pasta and a scale of indicia relating the circumference of a bundle of pasta to the quantity of cooked product to be obtained therefrom.

Another object is to provide such a pasta measurer wherein said measurer may be locked around said bundle of pasta to maintain said bundle in an easily manageable form prior to its introduction into a cooking vessel.

Another object is to provide a pasta measurer suitable for home use being small, compact, simple to use and of low cost.

BRIEF DESCRIPTION OF THE DRAWINGS

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

In the drawings:

FIG. 1 is a plan view of a preferred form of the device; and

FIG. 2 is a perspective view showing the measuring line looped around a bundle of spaghetti.

DETAILED DESCRIPTION OF THE INVENTION

Generally domestic pasta, such as spaghetti and vermicelli, is marketed in standard 10 and 12 inch lengths, and to accurately measure the quantity of a handful or hand-held bundle of such raw or uncooked pasta, the measurer includes a measuring line 5 that is flexible and unstretchable and of a suitable length of approximately ten inches. On one end of the line there is a ring 6 that fits on the thumb or finger of the user to provide a convenient support for the device.

On the line 5 adjacent the ring 6 there is a reference point 8, that is here shown as a narrowing of the line 5. Beginning on the side of this reference point remote from said ring and extending in a direction away from the ring, that is toward the free end of the line, the line 5 has gradations 9 thereon. As illustrated, both the reference point 8 and the gradations 9 are preferably symmetrical about the longitudinal centre line of the flat side of the tape-like line 5.

The gradations 9 comprise openings through the line 5. These are accessible from the side 11 of the tape by way of the discontinuities 12 in the side of the line 5. As illustrated in FIG. 1, the gradations 9 are marked as at 14 in terms of cooked pasta portions. This manner of gradation is particularly attractive where it is contemplated that the device will be used with a single length of pasta.

The free end of measuring line 5, that is the end of the line remote from the ring 6, has a finger grip tab 10 with flat surfaces which may bear indicia translating measurements taken on the line in terms of the amount (e.g. the number of serving portions) of cooked pasta such measured quantity of raw pasta will produce. This embodiment is useful where it is desired to adapt the device for measuring different lengths of pasta, as 10 inch and 12 inch. In this case the numbers 14 would be arbitrary and would be related to cooked portions by reference to the said indicia. In operation the ring 6 is slipped on the thumb or finger of the hand holding the bundle of pasta.

The line 5 is wrapped around the bundle and the narrow part 8 is slipped into the desired opening 9 via the discontinuity 12. As illustrated, the discontinuity 12 is substantially of only hair line width in the longitudinal direction of the tape. In order to arrive at the exact amount of pasta desired, it may be necessary to add to or remove from the bundle. Because the tape and the bundle can be held with one hand, this step is facilitated.

When the proper amount of pasta has been placed within the locked loop, the bundle will be held in convenient manageable form until added to the cooking vessel.

Obviously, the device can be utilized without resort to the locking feature where the pasta is to be added immediately to the cooking vessel.

Alternatively, as a first step, the device can be locked in a loop of the desired size, and then pasta added until the loop is filled. Where the material of the line 5 is self-supporting, and semi-rigid in the lateral direction, as is the preferred case, the loop can be laid on a counter top or the like, both hands utilized to set in the loop the requisite amount of pasta, and the loop then slid along the bundle to a position intermediate the ends to hold the bundle as above until cooking.

What we claim as our invention:

1. A measuring device for accurately measuring the amount of uncooked spaghetti or vermicelli or the like required to produce a given volume of cooked pasta comprising:

a flexible measuring tape having a series of calibrations to show directly the amount of uncooked said pasta required to yield a given number of cooked portions;

a ring device on one end of said tape;

a reference point for said calibrations toward the ring end of said tape, said reference point comprising a portion of said tape narrowed to form a neck symmetrical about the longitudinal centre-line of the flat side of said tape;

said calibrations comprising a series of holes through said tape along the longitudinal centre line of the flat side thereof, each said hole accessible to an edge of said tape through a discontinuity in said tape adjacent each said hole, each said discontinuity comprising substantially a hair line break in said tape and terminating in a notched configuration at said edge;

whereby said tape may be removeably locked into a selected one of said calibrations by insertion of said reference point into said selected calibration through the appropriate said discontinuity.

2. The device of claim 1 wherein said tape is of a semi-rigid material so as to permit the necessary longitudinal flexing but to permit limited lateral flexing.

* * * * *